365-119 SR
OR 3,568,167
953311
SEARCH ROOM
BEST AVAILABLE COPY

United States Patent [11] 3,568,167

[72] Inventor Arthur N. Carson
Bristol, Conn.
[21] Appl. No. 453,294
[22] Filed May 5, 1965
[45] Patented Mar. 2, 1971
[73] Assignee Carson Laboratories, Inc.
Bristol, Conn.

[54] OPTICAL INFORMATION STORAGE AND RETRIEVAL SYSTEMS
13 Claims, 7 Drawing Figs.

[52] U.S. Cl. 340/173, 350/160
[51] Int. Cl. G11c 13/04
[50] Field of Search 340/173, (L), (LSS), (LM); 88/10 (SR); 313/108 (B), 91; 315/8.5; 350/150, 160 (P); 178/7.81, 7.50, (Engineering Index Abstracts); 350/160 (P); 340/173

[56] References Cited

UNITED STATES PATENTS

| | | | |
|---|---|---|---|
| 2,416,574 | 2/1947 | Fonda | 313/91 |
| 2,836,754 | 5/1958 | Holborn et al. | 313/91 |
| 3,125,741 | 3/1964 | Kenneally | 340/173X |
| 3,220,013 | 11/1965 | Harris | 350/150X |
| 3,253,497 | 5/1966 | Dreyer | 88/1X |
| 3,341,825 | 9/1967 | Schrieffer | 330/4.3X |
| 3,341,826 | 9/1967 | Lee | 340/173 |
| 3,296,594 | 1/1967 | Van Herrden | 340/173 |

OTHER REFERENCES

James H. Schulman et al., Color Centers in Solids, Pergamon Press, Macmillan Co., New York, 1962, pp. 52— 55, 98— 101, 107— 112, 163— 167.

*Primary Examiner*—Terrell W. Fears
*Attorney*—David S. Fishman

ABSTRACT: An optical information storage and retrieval system is presented employing hydrogenated color center crystals as the storage medium. A composite of such crystals, whether hydrogenated or not, may be employed for multicolor storage. Also, an erasing system is disclosed in which erasing light is delivered to a storage crystal in leading relationship with respect to signal light, and erasing light is delivered to the crystal in lagging relationship with respect to readout light.

BEST AVAILABLE COPY

INVENTOR
ARTHUR N. CARSON

BEST AVAILABLE COPY

INVENTOR
ARTHUR N. CARSON

OPTICAL INFORMATION STORAGE AND RETRIEVAL SYSTEMS

This invention relates to optical information storage and retrieval systems, particularly systems and storage elements involving color centers in ionic crystals such as alkali halides.

An optical information processing system utilizing color centers, known as F centers, and the bleaching of these centers was disclosed and claimed in my application Ser. No. 217,858, filed Aug. 20, 1962 and now abandoned in favor of continuation application Ser. No. 871,392. The present invention relates to the structure of optical information storage elements, i.e. optical memories, and the incorporation of such memories in information processing systems using a single beam of light for the storage of information.

F center information storage units such as were the subject of my above-identified application ordinarily require that operation be carried out at about liquid air temperatures. The present invention utilizes the U center concept, an extension of the F center concept in which hydrogen is diffused into an F center, to achieve optical memory units in which information can be stored by bleaching at the warmer temperature of from about 20° C. to 100° C.

The present invention also accomplishes multicolor storage of information. A composite storage unit is made of powdered cubic alkali halides; or several different units, each sensitive to a different wavelength of incident light, are arranged one behind the other. The composite or the array then has the capacity to store information in color.

In addition, the present invention also teaches the utilization of thermal and/or electric field bleaching to aid in the storage of information in the alkali halide crystals.

As is also taught in the present invention, any of the bleaching methods, i.e. illumination of U centers by light alone, or illumination of F centers with light and with thermal and/or electric field aid can be used to create a highly effective monochromatic or multicolor optical memory.

Accordingly, one object of the present invention is to produce a novel optical information storage element, i.e. a memory element, using alkali halide crystals into which hydrogen has been diffused to form what is known as U centers.

Another object of the present invention is to produce a novel optical information storage unit in which information can be stored in color.

Still another object of the present invention is to produce a novel optical information storage unit in which information can be stored in alkali halide crystals at or near room temperature.

Still another object of the present invention is to produce a novel optical information storage unit in which thermal and/or electric field bleaching is used in the storage of information in alkali halide crystals.

Other objects and advantages will be apparent from the specification and claims and from the accompanying drawings which illustrate the invention.

Figure 1:
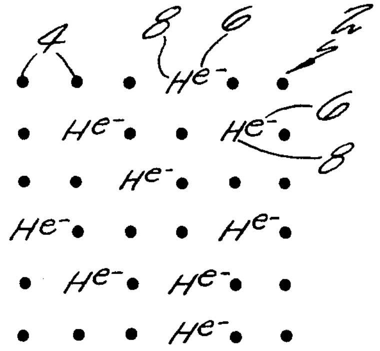
FIG. 1 is a representation of a memory unit having U centers.

Referring now to FIG. 1, an alkali halide crystal 2 is represented conceptually, the alkali and halide ions being represented by the dots 4. The crystal 2 has been colored first to a characteristic color by the formation of F centers, also known as color centers, in the known manner whereby electrons 6, characterized as $e-$, occupy vacancies in the crystal structure. The F centers are local imperfections in the crystal where electrons are trapped at the position of missing halogen ions. However, the crystal depicted in FIG. 1 also has a hydrogen atom 8 at most if not all of the vacancies occupied by the electrons 6, and the vacancies occupied by both an electron 6 and a hydrogen atom 8 to form, in essence, a negative hydrogen ion, are known as U centers.

The structure shown in FIG. 1 depicts a crystal having U centers. The U centers are formed in a crystal in which F centers have first been formed in the known manner to color the crystal with a characteristic color depending on the composition of the crystal. The crystal with F centers is placed in a hydrogen atmosphere at room temperature or higher and under a pressure of from 5 to 10 atm. The hydrogen atoms 8 diffuse into the crystal lattice to occupy, along the electrons 6, vacancies caused by missing halogen ions.

The formation of U centers in the crystal changes the absorption characteristic of the crystal from the visible range of light to the ultraviolet so that the crystal becomes bleached, i.e. transparent.

Figure 2:
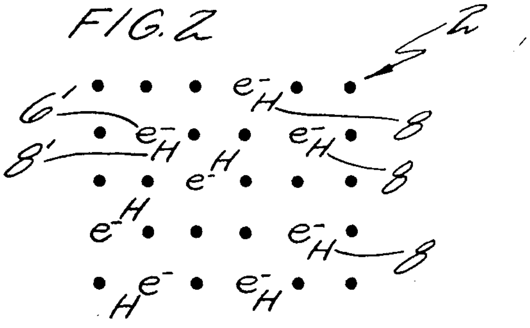
FIG. 2 is a representation of the unit of FIG. 1 after exposure to ultraviolet light.

To place the U center crystal into a state in which information can be sorted, the entire crystal is illuminated with ultraviolet light at room temperature. As is depicted in FIG. 2, this ultraviolet illumination ejects the hydrogen atoms 8 out of the U centers into interstitial positions. The crystal is thus retransformed into a characteristically colored crystal having F centers and also having hydrogen atoms in interstitial positions. The crystal is now in a state in which information can be stored.

Information is stored at a desired location in crystal 2 by illuminating the desired location with light of selected wavelength depending on absorption characteristics as determined by the composition of the crystal. The illumination light is preferably a laser beam. For example, a crystal could be illuminated with light at approximately 6300A from a helium-neon laser.

Figure 3:
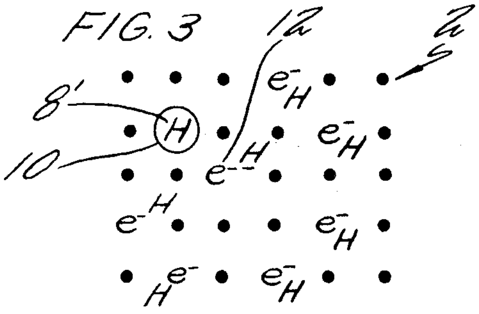
FIG. 3 is a representation of the unit of FIG. 2 in which information has been stored.

Referring to FIG. 3, the crystal of FIG. 2 is depicted after a selected area has been illuminated, it being expressly understood that this discussion on a microscopic basis is for purposes of illustration only, whereas in reality an illuminated area would contain many U centers. Upon illumination of a selected area of crystal 2 with the laser light with crystal temperature held at between 20° C. and 100° C. the illuminated area being shown as contained within the boundary 10, the electron 6′ (see FIG. 2) in the F center is ejected to form the F′ center depicted by the electron 12 (FIG. 3) having a double negative charge $e$—. Concomitantly with the ejection of the electron from the F center, the previously interstitial hydrogen atom 8′ diffuses back into the vacancy as shown in FIG. 3. The F′ center then decays and releases its extra electron which then returns to atom 8′ in the area within boundary 10 to complete regeneration of a bleached U center.

The ejection of the electron 6′ from the F center, the diffusion of the hydrogen atom 8′ into the vacancy, and the subsequent recapture of the electron bleaches the illuminated portion of the crystal. That is, the illuminated portion 10 of the crystal will no longer absorb the illuminating light; the state of that portion of the crystal has been changed, and a bit of information has thus been stored in the crystal.

The storage of a bit of information through the concomitant ejection of an electron and the diffusion of a hydrogen atom into the vacancy upon illumination by the laser beam is sensitive to temperature. If the process of storing information is carried out at too high a temperature the interstitial hydrogen atom 8′ can diffuse into the F center to bleach the area 10 without necessity for illumination, and no selective information storage can be accomplished. However, at some optimum temperature, between 20° C. and 100° C. depending on the material used (approximately 80° C. for KBr:H), a large proportion of the hydrogen atoms 8 in an illuminated area thermally diffuse into the vacancies during the interval when the

BEST AVAILABLE COPY electrons are retained by F′ centers. Thus, bleached U centers are created representing a stored bit of information which is stable, the stable bleached condition being created and maintained in selected portions of the crystal at room temperatures.

At temperatures around −70° C. and lower there is no diffusion of hydrogen atoms from interstitial positions into vacancies, but F′ centers are permanently stable at these temperatures. Therefore, a crystal having F centers, whether or not interstitial hydrogen atoms are present, can be selectively bleached by a combination of optical excitation, i.e. illumination by a single beam of intense coherent light, and thermal effects that are still sufficiently influential at −70° C. to effect the transfer of an electron from the excited F state (i.e. after illumination) to the F′ state. In this manner, it can be seen that information can be stored in the crystal by the use of only a single beam of radiation.

Information can also be stored in F center crystals at temperatures around −200° C. through the interaction of selective illumination and an electric field impressed across the crystal. An electric field impressed across the crystal has the effect of increasing the energy level of the trapped electrons. Expressed in other language, the electric field makes the crystal actually at −200° C. behave as if it were at approximately −70° C. The concurrent illumination of a portion of the crystal and impression of an electric field thus causes F center electrons in the illuminated portion to migrate to stable F′ centers bleaching the illuminated portion. Thus, information is stored in a crystal at approximately −200° C. through the combined effects of selective illumination and an electric field across the crystal.

Any of the above described bleaching methods, i.e. those for F center bleaching or U center bleaching, can be used to store information in alkali halide crystals in a plurality of colors. That is, information originally in more than one color.

Figure 4:
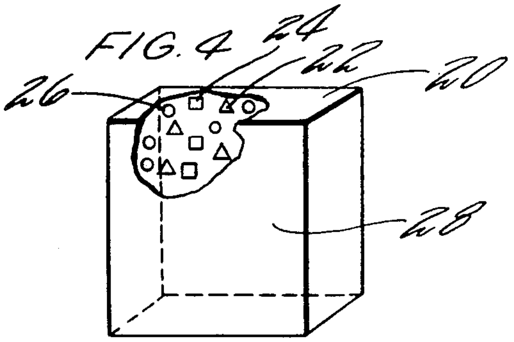
FIG. 4 is a representation of a composite memory unit for the storage of information in color.

Referring to FIG. 4, a crystal 20 is depicted that can be used for multicolor storage. The crystal is a composite of several different powdered cubic alkali halides, three different kinds being shown for purposes of illustration as triangles 22, squares 24, and circles 26. The triangles 22, squares 24, and circles 26 are each responsive to being bleached by a light of a different wavelength. The powdered alkali halides must all be optically isotropic and must be of the cubic type. The composite crystal 20 is compacted from the powders by known methods in spectroscopy for compacting specimen carrier pellets.

Figure 5:
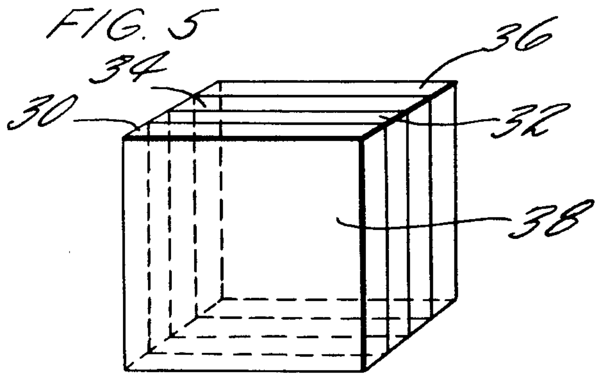
FIG. 5 is a representation of an array of crystals to form another type of memory unit in which information can be stored in color.

Another crystal embodiment that can be used for multicolor information storage is shown in FIG. 5 where several different crystals 30, 32, 34 and 36 are stacked one behind the other to form a total composite crystal. The adjoining surfaces of the individual crystals, i.e. the contacting faces, are optically flat or mating surfaces so that each crystal is in optical contact with the crystal or crystals it adjoins. Additionally, each of the crystals 30, 32, 34, and 36 is made of a different alkali halide so that each crystal is bleached by a light of a different wavelength.

The multicolor storage of information in the composite crystal of either FIG. 4 or FIG. 5 can be accomplished whether the crystals are F center crystals or U center crystals. In either case, the composite crystal is illuminated with multicolor light representing multicolor information that is to be stored, e.g. a multicolor map. The multicolored light would be either a transparency or a reflection from the information to be stored, and it would be directed at the face 28 of the FIG. 4 crystal or face 38 of the FIG. 3 crystal. Bleaching of the crystals could be by any of the methods described above.

In the FIG. 4 crystal the various alkali halides would be bleached if illuminated by the proper color of light. For example, in any one section of the crystal the alkali halides represented by squares 24 would become bleached, i.e. transparent to a particular wavelength, if illuminated by that wavelength, while other alkali halides in that section would be unaffected. Similarly, in another section of the crystal in the triangles 22 would become bleached and transparent to a different wavelength. Thus, different alkali halides throughout the crystal would become bleached and transparent to a different colors of light depending on the particular color of a multicolored pattern incident on a particular section of face 28 of the crystal. A multicolored pattern of information would thereby be stored in the composite crystal.

In the composite crystal of FIG. 5 a similar selective bleaching commensurate with the wavelengths of incident light would occur with the selective bleaching taking place in the individual crystals 30—36 making up the composite. For example, light of one wavelength would bleach only crystal 30, light of another wavelength would bleach crystal 32, and each of the other crystals would each be bleached by other wavelengths. Thus, multicolored light incident on face 38 would bleach portions of the individual stacked crystals. Light of a first wavelength would bleach crystal 30 but not affect the other crystals; light of a second wavelength would pass through crystal 30 with no effects but would bleach crystal 32; similar results would be achieved for the other crystals at other wavelengths. Thus, a multicolored pattern on face 38 would result in portions of each of the stacked crystals 30—36 becoming bleached, and a multicolored information pattern would be stored in the composite crystal.

Readout of stored information is accomplished by illuminating the entire crystal and projecting the output on a screen.

Regardless of whether information is stored in multicolor or in a single color, and regardless of whether F center crystals or U center crystals are used, the retrieval of the stored information, readout, must be accomplished at a temperature low enough so that unbleached portions of the crystal do not become bleached. Readout can be accomplished by illuminating a crystal with the light used for bleaching or, especially with a composite crystal as in FIG. 4 or FIG. 5, with white light. With a U center crystal readout should occur at about 0° C.; with an F center crystal readout should occur at about −200° C. and without the influence of an electric field if one was used for bleaching.

If readout is by illuminating the crystal with light of the color used for bleaching, the bleached areas representing stored information will be transparent to the light and will pass the light to indicate stored information. The unbleached areas will absorb the light, and it is thus essential that the readout temperature be sufficiently low so that the entire crystal does not become bleached. Similarly, if white light is used for readout only bleached areas representing stored information will pass light of the bleaching wavelength. Multicolored stored information will be reproduced by white light illumination since only areas bleached by a particular color will pass the particular color.

The information sorted in a crystal can be erased so that the crystal can be reused. An F center crystal can be erased by illuminating it with infrared light, and U center crystals can be erased by illumination with ultraviolet light.

Figure 6:
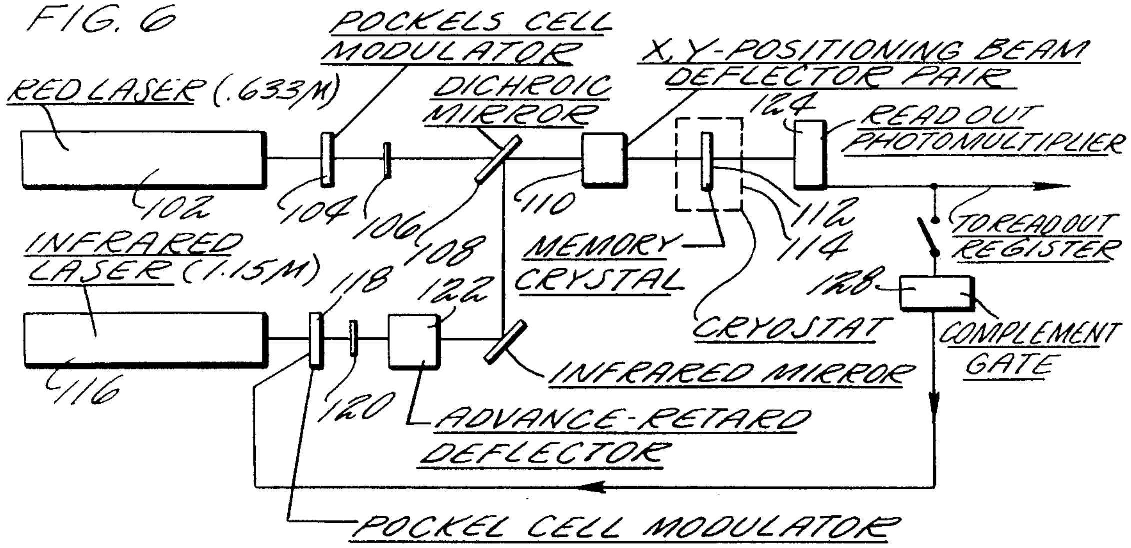
FIG. 6 is a schematic representation of an optical information storage and retrieval system.

Referring now to FIG. 6, an information storage and retrieval system is shown using an alkali halide crystal for the memory element. The system uses a continuous wave helium-neon gas laser 102 having a wavelength of 0.633$\mu$ to produce a red output beam. The output beam meets a modulator such as Pockels cell 104 in the output path of the laser. Pockels cell modulator 104 is programmed so that it will ordinarily allow passage of the laser beam through modulator 104 and a polarizer 106 which has its axis aligned with the plane of vibration of the laser beam; or, modulator 104 can be pulsed by signals from a programmer (not shown) to rotate the plane of vibration of the laser beam so that it will be crossed with the axis of polarizer 106 to prevent passage of the laser beam.

The laser beam that does pass through modulator 104 and polarizer 16 then passes through dichroic mirror 108 to beam deflector 110. Beam deflector 110 is an electro-optic crystal device such as barium titanate which undergoes changes in index of refraction under the influence of electric fields so that the laser beam passing therethrough can be selectively deflected. It is desired to deflect the laser beam in both

BEST AVAILABLE COPY horizontal and vertical directions, so deflector 110 can be made up of a pair of barium titanate prisms crossed with respect to each other or can consist of a single crystal with mutually perpendicular pairs of electrodes. Electric fields, such as from suitably programmed staircase generators (not shown), would be imposed across the individual prisms or the mutually perpendicular electrodes to accomplish desired horizontal and vertical deflections of the laser beam.

The laser beam would be delivered form deflector 110 to an F center memory crystal 112 (such as a KBr crystal) which may be in a cryostat 114 to achieve a temperature of −200° C. Cryostat 114 is provided with windows to allow passage of light into and through the cryostat. An electric field impressed across crystal 112 creates a condition comparable to the crystal being at −70° C. to facilitate bleaching. In the process of writing information into crystal 112, the deflected beam from deflector 110 would be directed to the selected portion of crystal 112 to bleach that portion of crystal 112 and store a bit of information. When writing information into crystal 112, it is necessary to make sure that information previously stored in the crystal is erased. To accomplish this end, the output beam from an infrared laser 116 (wavelength 1.15$\mu$) passes through a Pockels cell 118 and a polarizer 120 to an electro-optical crystal deflector 122 similar to deflector 110. The laser beam is then delivered to infrared mirror 124 and thence to dichroic mirror 108 and thence through deflector 110 to memory element 112. The wavelength of the beam from laser 116 causes erasure, and hence coloring, of any bleached spot it illuminates in crystal 112.

In writing information into crystal 112, Pockels cell 118 will be programmed so that the plane of vibration of the laser beam from laser 116 is aligned with the axis of polarizer 120 to allow passage of the beam. Deflector 122 is programmed with respect to the program of deflector 110 so that the beam delivered from laser 116 and deflector 122 to crystal 112 leads by one bit position the writing beam for laser 102, the programming of deflector 122 being accomplished, for example, by electric fields impressed across the deflector from a staircase generator (not shown). In this manner, it is assured that the writing beam from laser 102 is delivered to a portion of crystal 112 that is clear of any previously stored information.

Reading out of information stored in crystal 112 is accomplished through selective interrogation of portions of crystal 112 by illuminating the selected portion with the output beam from laser 102 with the electric field across the crystal during write-in removed. A bleached spot (representing a bit of stored information) will pass the laser light through the crystal to a photomultiplier 124, the output of which is then delivered to a readout register.

The interrogating light from laser 102 will a cause some unwanted bleaching of any unbleached portion of crystal 112 that it illuminates while being scanned across the crystal by the deflections programmed into deflector 110. To erase this unwanted bleaching, the erasing output from laser 116 is programmed by deflector 122 to lag, on its delivery to crystal 112, by one bit position the output from laser 102. Additionally, normally open switch 126 is closed to connect complement gate 128 to Pockels cell 118. If the output from photomultiplier 124 indicates light has been received from crystal 112 (the situation when a stored bit of information has been illuminated by the beam from laser 102), the signal from complement gate 128 will pulse modulator 118 so that the plane of vibration of the beam of laser 116 is crossed with the axis of polarizer 120. Thus, no erasing light will be delivered to crystal 112 by the now lagging beam from laser 116. However, if there should be no signal on photomultiplier 124 (indicating that the beam from laser 102 has illuminated an unbleached spot on crystal 112), complement gate 128 will deliver a pulse to modulator 118 to allow passage of erasing light from laser 116. Bearing in mind that this interrogated portion of crystal 112 will become slightly bleached by the light from laser 102, the lagging light from laser 116 in inverse relationship to output from photomultiplier 124 will erase this slight bleaching to regenerate the contrast between bleached and unbleached portions of the crystal.

Although the foregoing operation of the embodiment of FIG. 6 has been described with an F center crystal under the influence of an electric field during writing, it will be understood that other crystals such as a U center crystal or a composite multicolor crystal could also be used, or the cryostat could be maintained at −70° C for the combined optical and thermal bleaching.

Figure 7:
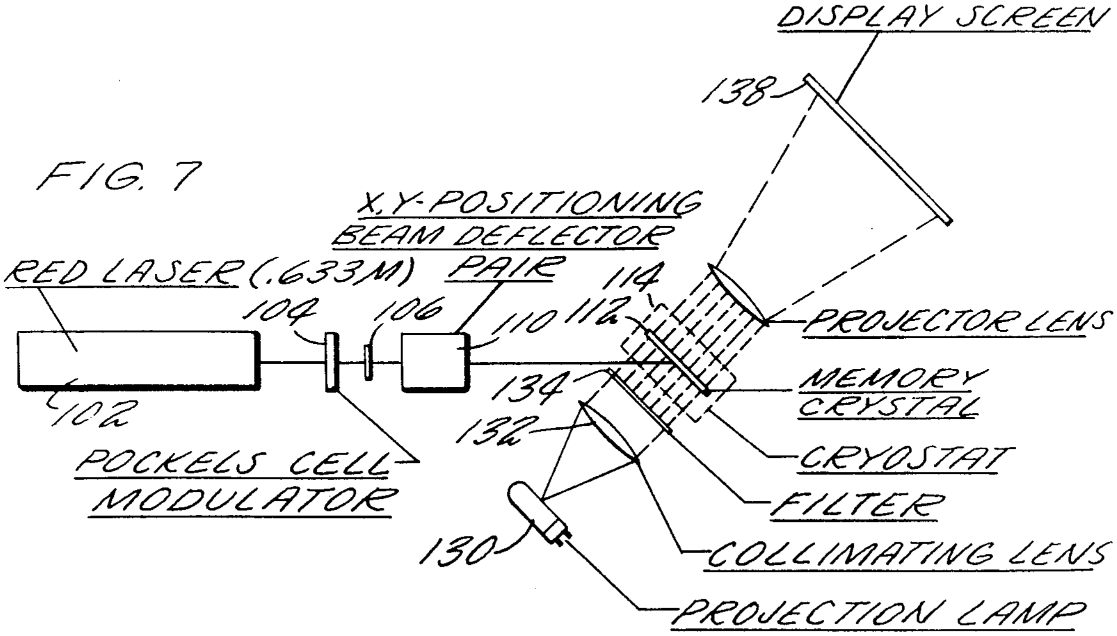
FIG. 7 is a schematic representation of a modification of the optical information storage and retrieval system of FIG. 6.

Another type of information storage and retrieval system is shown in FIG. 7 with corresponding elements numbered as in FIG. 6. The storage of information in this FIG. 7 embodiment is accomplished as in the FIG. 6 system: light from red laser 102 passes through suitably programmed Pockels cell 104 and polarizer 106 to deflector 110 and thence to memory element 112 in cryostat 114 to bleach selected portions of element 112 and store information therein.

Readout of stored information in the FIG. 7 embodiment is by projection of part or all of the crystal 112 on a screen, i.e. using the selectively bleached crystal as a transparency. Light from a projection lamp 130 is collimated by lens 132 and delivered to filter 134 which passes only light of the wavelength of the beam from laser 102, but of a lesser intensity. The light passed by filter 134 illuminates crystal 112 and passes through the bleached, i.e. transparent, parts of the crystal where bits of information have been previously sorted. Unbleached portions of the crystal absorb the light from filter 134. The light passed through crystal 112 is delivered by projector lens 136 to a screen 138, and the resultant display on screen 138 is a pattern showing the information stored in crystal 112.

As was the case with the FIG. 6 embodiment, any of the previously described memory crystals can be used in the structure of FIG. 7. If an F center crystal is used with high intensity and long duration of readout light from filter 134, some undesired bleaching of the unbleached portions of crystal 112 might occur. It would then be necessary that filter 134 also pass infrared light to erase the unwanted bleaching to regenerate the unbleached areas. However, this would also cause some erasing of the stored information, and the output from laser 102 would have to be reprogrammed by pulsing modulator 104 according to the display on screen 138 to rebleach the previously bleached portions of crystal 112.

It is to be understood that the invention is not limited to the specific embodiments herein illustrated and described, but may be used in other ways without departure from its spirit as defined by the following claims.

I claim:

1. In a system for storage of information, a crystal having color centers therein and hydrogen atoms in interstitial positions in said crystal, and means for selectively illuminating at least part of said crystal with light of a selected wavelength and intensity to transform at least some color centers in said illuminated part to bleached centers each having a previously interstitial hydrogen atom therein, said crystal being maintained at a temperature from 20° C. to 100° C.

2. A system as in claim 1 including means for illuminating said crystal with a selected light to interrogate said crystal and read out information stored therein, said crystal being maintained at or below a temperature of 0°C. during said illuminating to interrogate.

3. A system as in claim 1 wherein said crystal is an alkali halide.

4. In a system for storage of information, a crystal having F centers therein and hydrogen atoms at interstitial positions in said crystal, said F centers and interstitial hydrogen atoms having been established by illuminating U centers in said crystal with a first light, and means for selectively illuminating at least part of said crystal with a second light to transform at least some F centers in said illuminated part to bleached U centers, said crystal being maintained at a temperature from 20° C. to 100° C.

5. In the method of storing information in a crystal having color centers therein and hydrogen atoms in interstitial positions in said crystal, the steps of maintaining said crystal at a temperature from 20° C. to 100° C., and selectively illuminating at least part of said crystal with light of a selected wavelength and intensity to transform at least some color centers in said illuminated part to bleached centers each having a previously interstitial hydrogen atom therein.

6. In the method of storing information in a crystal having F centers therein and hydrogen atoms in interstitial positions in said crystal, said F centers and interstitial hydrogen atoms having been established by illuminating U centers with a first light, the steps of maintaining said crystal at a temperature from 20° C. to 100° C., and selectively illuminating at least part of said crystal with a second light to transform at least some F centers in said illuminated part to bleached U centers.

7. An optical information handling system including:

means for generating an optical signal commensurate with a bit of information;

a crystal having color centers therein;

means for directing said optical signal to a desired part of said crystal to bleach at least some color centers in said desired part to store said bit of information in said crystal;

means for generating an erasing signal for erasing information stored in said crystal;

means for directing said erasing signal to said crystal in leading relationship with respect to said optical signal to clear said part of said crystal prior to delivery of said optical signal thereto;

means for generating a readout signal;

means for delivering said readout signal to said crystal to generate an output from said crystal commensurate with information stored in said crystal;

means for receiving said output to indicate information stored in said crystal;

means responsive to said receiving means for generating an erasing signal in inverse relationship to the indication of information stored in said crystal; and means for delivering said inversely generated erasing signal to said crystal in lagging relationship with respect to said readout signal to erase bleaching of said crystal caused by said readout signal.

8. An optical information handling system as in claim 7 wherein said optical signal generating means includes means for modulating an optical signal and wherein said means for directing said optical signal includes electro-optical crystal means for deflecting said optical signal, and wherein said means for directing said erasing signal includes electro-optical crystal means for deflecting said erasing signal.

9. An optical information handling system including means for generating an optical signal commensurate with a bit of information, a crystal having color centers therein, means for directing said optical signal to a desired part of said crystal to bleach at least some color centers in said desired part to store said bit of information in said crystal, means for generating a readout signal, means for delivering said readout signal to said crystal to generate an output from said crystal commensurate with information stored in said crystal, a readout screen, means for projecting said readout on said screen, and means for erasing unwanted bleaching of said crystal caused by said readout signal.

10. In a system for storage of information, a composite crystal, said composite crystal having first color centers therein responsive to being bleached by light of a first wavelength, and said composite crystal having at least second color centers therein responsive to being bleached by light of a second wavelength, and means for illuminating at least part of said composite crystal with light having at least said first and second wavelengths to bleach at least some of first and second color centers in said illuminated part according to the wavelengths of light incident on said crystal to store a multicolored pattern of information in said crystal in a plurality of colors.

11. A system as in claim 10 including means for illuminating said composite crystal with light having a plurality of wavelengths to interrogate said crystal and produce a multicolor readout of information stored in said composite crystal.

12. A system as in claim 10 wherein said composite crystal includes a plurality of different powdered cubic alkali halides, said powdered alkali halides being optically isotropic.

13. A system as in claim 10 wherein said composite crystal includes a plurality of individual alkali halide crystals aligned with faces in abutting relationship and with adjoining faces of said individual crystals being optically mating, at least some of said individual crystals being different alkali halides.